United States Patent
Bar-Zeev et al.

(10) Patent No.: US 9,959,334 B1
(45) Date of Patent: May 1, 2018

(54) LIVE DRONE OBSERVATION DATA RECORDING

(71) Applicant: Amazon Technologies, Inc., Seattle, WA (US)

(72) Inventors: Avi Bar-Zeev, Oakland, CA (US); Elad Ben-Israel, London (GB); Daniel Buchmueller, Seattle, WA (US); Brandon William Porter, Yarrow Point, WA (US)

(73) Assignee: Amazon Technologies, Inc., Seattle, WA (US)

( * ) Notice: Subject to any disclaimer, the term of this patent is extended or adjusted under 35 U.S.C. 154(b) by 401 days.

(21) Appl. No.: 14/741,314

(22) Filed: Jun. 16, 2015

(51) Int. Cl.
*G06F 17/30* (2006.01)
*H04L 29/06* (2006.01)
*H04L 29/08* (2006.01)

(52) U.S. Cl.
CPC .. *G06F 17/30581* (2013.01); *G06F 17/30516* (2013.01); *H04L 65/60* (2013.01); *H04L 67/1095* (2013.01)

(58) Field of Classification Search
USPC ......................................................... 707/611
See application file for complete search history.

(56) References Cited

U.S. PATENT DOCUMENTS

| | | | | |
|---|---|---|---|---|
| 9,529,360 B1* | 12/2016 | Melamed | ............ | G05D 1/0022 |
| 2005/0262097 A1* | 11/2005 | Sim-Tang | ......... | G06F 17/30085 |
| 2006/0253254 A1* | 11/2006 | Herwitz | .................. | G01S 13/86 |
| | | | | 701/301 |
| 2011/0043627 A1* | 2/2011 | Werling | .................. | G06T 17/05 |
| | | | | 348/143 |
| 2014/0172944 A1* | 6/2014 | Newton | ................ | H04L 65/403 |
| | | | | 709/202 |
| 2014/0279764 A1* | 9/2014 | Lahr | ..................... | G06F 9/5038 |
| | | | | 706/12 |
| 2015/0070392 A1* | 3/2015 | Azulai | .................... | G06T 19/00 |
| | | | | 345/634 |
| 2015/0142991 A1* | 5/2015 | Zaloom | .................. | H04L 43/10 |
| | | | | 709/248 |
| 2015/0346722 A1* | 12/2015 | Herz | .................... | G05D 1/0038 |
| | | | | 701/2 |
| 2016/0149696 A1* | 5/2016 | Winslow | ............... | H04L 9/0618 |
| | | | | 380/28 |
| 2016/0332747 A1* | 11/2016 | Bradlow | ................ | B64D 47/08 |
| 2016/0336020 A1* | 11/2016 | Bradlow | ................ | G01S 19/49 |
| 2016/0337441 A1* | 11/2016 | Bloomquist | .......... | G06F 9/5061 |

\* cited by examiner

*Primary Examiner* — Cam Linh T Nguyen (74) *Attorney, Agent, or Firm* — Kilpatrick Townsend & Stockton LLP (57) ABSTRACT

Techniques described herein include a system and method for aggregating multiple data streams related to a drone mission event into a single data stream. In this disclosure, a service provider may receive multiple data streams from various data sources in either real time, post facto, or a combination of the two. The data streams may be synchronized and combined using multiplexing techniques. Additionally, one or more observers are provided with the capability to append log entries to the data streams at particular time markers. In some embodiments, the time markers associated with a log entry may be updated at a later time to more accurately reflect events.

19 Claims, 8 Drawing Sheets

LIVE DRONE OBSERVATION DATA RECORDING

BACKGROUND

Along with the increasing use of, and interest in flying drone technology, there is an increasing demand for alternative technology solutions. For example, flight-related data for a vast majority of aircraft are typically recorded on a flight recorder (or black box) device. However, these flight recorder devices (as well as the additional sensors needed to provide the input necessary for the device) tend to add weight to the aircraft. Although this is not problematic for most aircraft, this is a critical issue for smaller aircraft, such as drones, that are able to carry less weight to begin with.

Additionally, data necessary for a thorough analysis of a drone flight may be scattered across multiple sources and may not be readily accessible. A technician attempting to discern the cause of an accident or malfunction is often not presented with the whole picture.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a method and system for aggregating log data and other event-related data into a single event stream that may be stored. Multiple streams of data from a variety of sources may be synchronized and/or aggregated along with manually entered user log data into a single event stream. An event stream may be any suitable combination of data streams that provides an understanding of conditions during a mission event.

In accordance with at least some embodiments, a service provider collects data from various sources for aggregation into a single event stream. In accordance with at least some embodiments, the data may be collected in real-time during a mission event. Users may be able to view the event stream on one or more display devices. The data may be aggregated after a mission event. For example, a flying drone may capture flight data on a storage device (i.e., a secure digital [SD] card) which may later be combined with data from other sources. In accordance with at least some embodiments, the service provider may synchronize the data prior to aggregating it. In accordance with at least some embodiments, a user may be able to provide comments or log data. In accordance with at least some embodiments, the user may be presented with a chat style, or instant messenger style comment interface in which multiple users are able to add comments to a mission event. The comments made by a user may be added to the event stream at particular time markers. The user may elect a classification for his or her comments. Additionally, the user may only be presented with comments of a particular classification or classifications based on user settings and/or an authorization or status associated with the user. For example, a user may be associated with particular permissions based on a workplace role or a status within the user's organization. As an additional example, the user may be assigned as a pilot for a particular mission event and may be granted certain permissions necessary for performing the duties of a pilot. In this example, the permissions necessary for performing the duties of a pilot may only be granted with respect to a mission event instance in which the user is assigned the pilot role.

By way of illustrative example, consider a scenario in which a drone flight is scheduled to be performed. In this scenario, the drone will take off from a launch area equipped with multiple external sensor devices. For example, a weather station located at the launch site will determine the weather conditions at the site. A laser system may be used to ensure that the launch area is clear. A digital camera may be used to remotely monitor the drone. All of the data collected by the external sensor devices may be streamed to a service provider. In addition, data related to the health or status of the drone itself may also be streamed to the service provider. The service provider may combine one or more of these data streams into a single event stream that provides a more comprehensive view of the circumstances surrounding the drone flight. In addition, the service provider may append user logs to the event stream. For example, users may be commenting textually on the drone flight as it occurs. The service provider may append these textual comments to the event stream based on time markers. In the alternative, the users may be orally commenting on the drone flight as it occurs. These oral comments may be included in an audio data stream that may also be added to the event stream. The service provider may also append data to the event stream at a later date. For example, data collected by the drone on an SD card may be added to the event stream.

Figure 1:
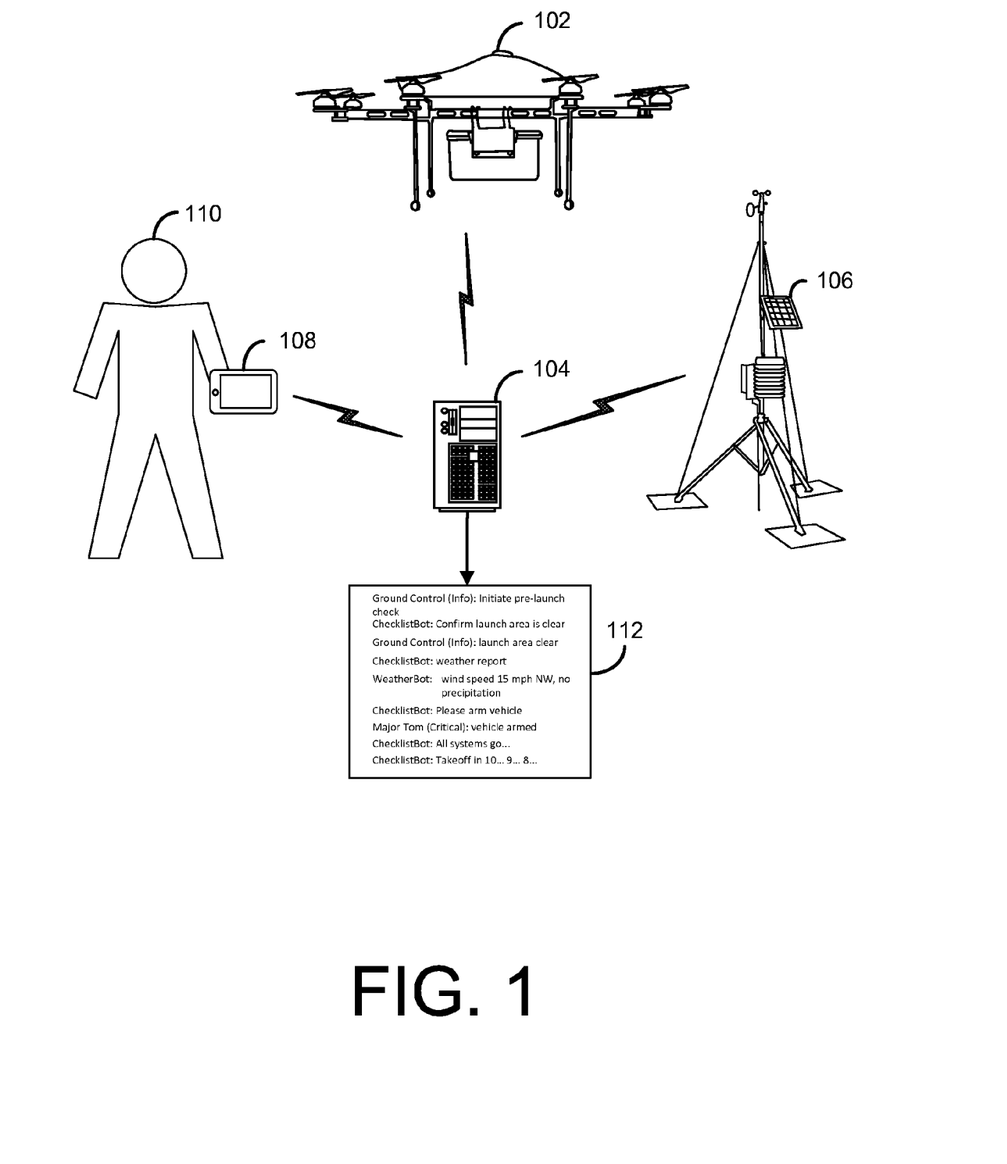
FIG. 1 depicts an illustrative example aggregation of an event stream for a mission event in accordance with at least one embodiment.

FIG. 1 depicts an illustrative example aggregation of an event stream for a mission event. A mission event is any event for which an event stream may be desired. For example, a mission event may be a flight for a drone. In FIG. 1, a drone 102 is depicted in flight. Although a specific flying drone is depicted, it should be recognized that a drone may refer to any suitable unmanned or remote vehicle. In accordance with at least one embodiment, the drone 102 may be in communication with a service provider 104. In accordance with at least some embodiments, the drone 102 may contain one or more sensor devices capable of gathering input data. The input data gathered by the drone 102 may be transmitted to the service provider 104. The service provider 104 may also be in communication with various data sources. For example, the service provider 104 may be in communication with a weather station 106 or other device capable of monitoring external conditions. The service provider may be in communication with a user device 108. A user 110 may be able to provide log comments via the user device 108.

In accordance with at least some embodiments, the service provider 104 may aggregate data streams from sources such as the user device 108, the drone 102, and/or external condition monitoring devices such as the weather station 106. In accordance with at least some embodiments, the data streams may be combined or aggregated into a single event stream 112 that contains multiple types of information related to a mission event for the drone 102. In accordance with at least some embodiments, the user 110 is able to append log comments to the event stream 112 via user device 108. Log comments may contain time indicators that may be used to append the log comments to the event stream 112.

In accordance with at least some embodiments, the appended event stream 112 may be reviewed by a technician in order to identify the cause of one or more events. The event stream 112 data may be used to determine a status of the drone 102 at any suitable time during the mission event.

Figure 2:
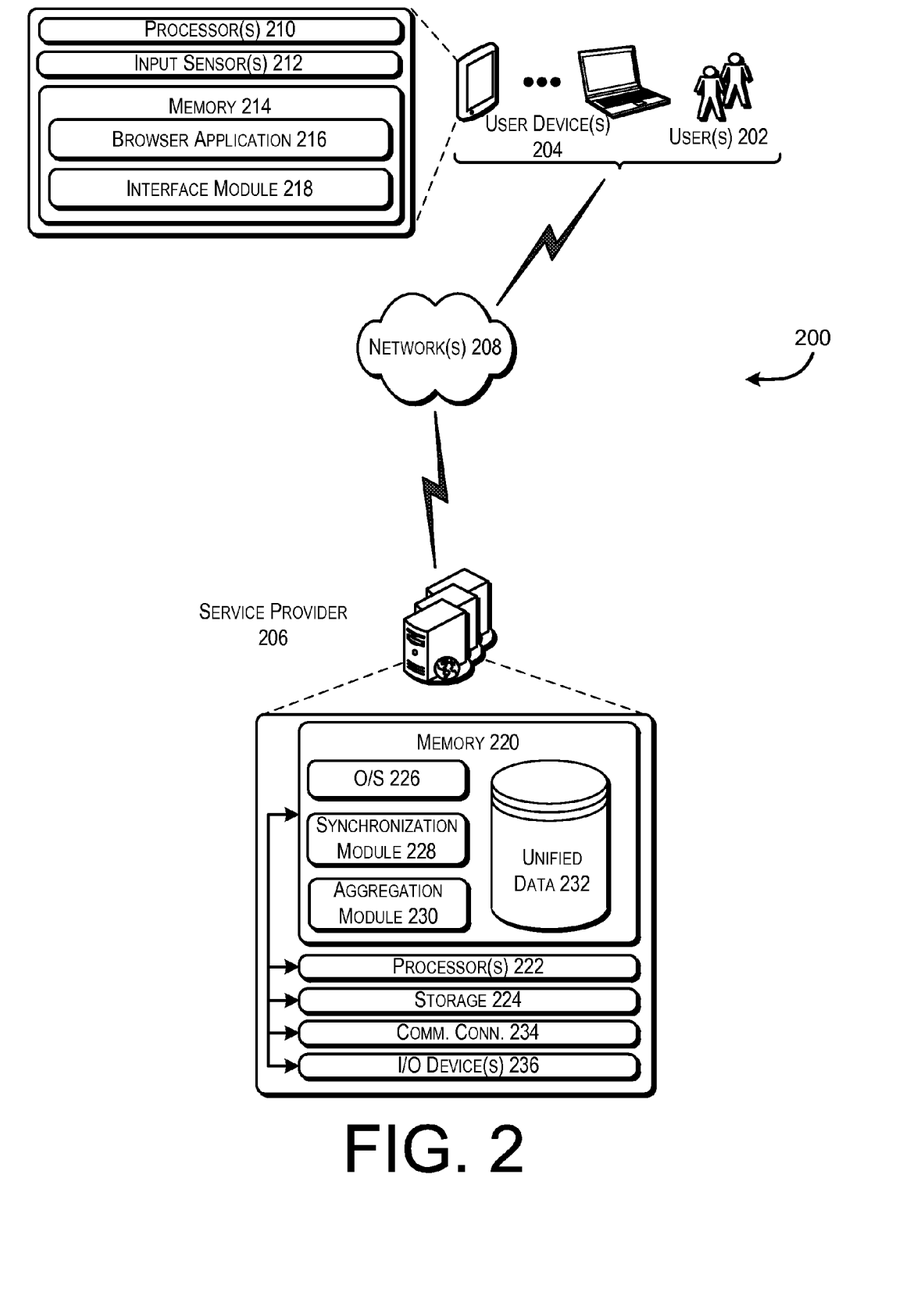
FIG. 2 depicts an illustrative example of a system and/or architecture in which techniques for aggregating event data into a common stream may be implemented in accordance with at least one embodiment.

FIG. 2 depicts an illustrative example of a system or architecture 200 in which techniques for aggregating event data into a common stream may be implemented. In architecture 200, one or more operators and/or users 202 may utilize user devices 204. In some examples, the user devices 204 may be in communication with a service provider 206 via the network(s) 208, or via other network connections.

The user devices 204 may be any suitable type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any suitable type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. The memory 214 may also include an interface module 218 that is capable of acting as a user interface between the user and the service provider. More specifically, the interface module 218 may be configured to display received event data in real time on a user device as well as receive log input from a user. Although sample architecture 200 depicts an interface module 218 as being included in the contents of the memory 214 of the user device 204, some embodiments may not include an interface module 218 in memory 214 of the user device 204. In those embodiments in which the interface module 218 is not included in memory 214, input received by the input sensors 212 may be transmitted to and processed by the service provider 206. Additionally, the browser application 216 may be capable of displaying data received from service provider 206. For example, data provided by the service provider may be presented on a website (or network site).

In accordance with at least some embodiments, the interface module 218 may be configured to display received event data on a user device and/or to receive log input from a user. In accordance with at least some embodiments, the interface module 218 may present information to a user of a user device in real time. In at least some embodiments, data may be presented in a chat-style window as it is received. In accordance with at least some embodiments, the interface module 218 may convey user input to the service provide for aggregation with the event stream. User input may be textual input, audio input, visual input, or any other suitable type of data input.

In some examples, the network(s) 208 may include any one or a combination of many different types of networks, such as cable networks, the Internet, wireless networks, cellular networks, and other private and/or public networks. While the illustrated example represents the users 202 accessing the browser application 216 over the network(s) 208, the described techniques may equally apply in instances where the users 202 interact with a service provider 206 via the user device 204 over a landline phone, via a kiosk, or in any suitable other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206, such as to store, access, and/or manage data, develop and/or deploy computer applications, and/or host web content. The one or more service provider 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any suitable type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment. In accordance with at least some embodiments, network 208 may be a private local network and service provider 206 may not be connected to an external network. For example, the service provider 206 may be set up in a remote or temporary location. In this case, information from the service provider 206 may be uploaded to another system at a later time.

In one illustrative configuration, the service provider 206 may include at least one memory 220 and one or more processing units (or processor(s)) 222. The processor(s) 222 may be implemented as appropriate in hardware, computer-executable instructions, firmware, or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for synchronizing data streams (synchronization module 228) and a module for aggregating multiple data streams into a single event stream (aggregation module 230). The memory 220 may also include unified data 230, which provides access to data aggregated from various sources. In some embodiments, the unified data 230 may be stored in a database.

The memory 220 and the additional storage 224, both removable and non-removable, are examples of computer-readable storage media. For example, computer-readable storage media may include volatile or non-volatile, removable or non-removable media implemented in any suitable method or technology for storage of information such as computer-readable instructions, data structures, program modules, or other data. As used herein, modules may refer to programming modules executed by computing systems (e.g., processors) that are part of the user device 204 or the service provider 206. The service provider 206 may also contain communications connection(s) 232 that allow the service provider 206 to communicate with a stored database, another computing device or server, user terminals, and/or other devices on the network(s) 208. The service provider 206 may also include input/output (I/O) device(s) and/or ports 234, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing unified data 230 and the one or more application programs or services for implementing the features disclosed herein, including a synchronization module 228 and/or an aggregation module 230.

In some embodiments, the synchronization module 228 may be configured to synchronize received data from the interface module 218 and/or the unified data 230. The synchronization module may be used to synchronize data collected in real time or collected post-facto (after the fact). For example, the synchronization module may be configured to match up audio logs, wind speed data, and altitude data in order to correlate events in each of the data streams. To do this, the synchronization module 228 may match up time markers or other indicators throughout the data streams. This will be described in greater detail with respect to FIG. 4.

In some embodiments, the aggregation module 230 may be configured to receive data from the unified data 230 and combine one or more data streams as well as user log input into a single event stream. In accordance with at least some embodiments, data may be aggregated after an event into an event stream for that event. In accordance with at least some embodiments, the aggregation module 230 may be a multiplexer capable of multiplexing multiple streams of data into a single stream of data. In accordance with at least some embodiments, the aggregation module 230 may be configured to perform one or more data indexing techniques.

Unified data 230 may be predetermined or it may be dynamically generated. For example, unified data 230 may include data from one or more sources that is being updated in real time. For example, unified data may include streaming video or audio data, external data (e.g., weather condition data), internal data (e.g., data related to drone mechanical conditions), workflow data, or any other suitable data. External data may be any data collected regarding conditions outside of the drone associated with the mission event. Internal data may be any data collected regarding conditions inside, or related to a health or status of, the drone. Unified data 230 may contain a database management system (DBMS) and/or a data stream management system (DSMS).

Figure 3:
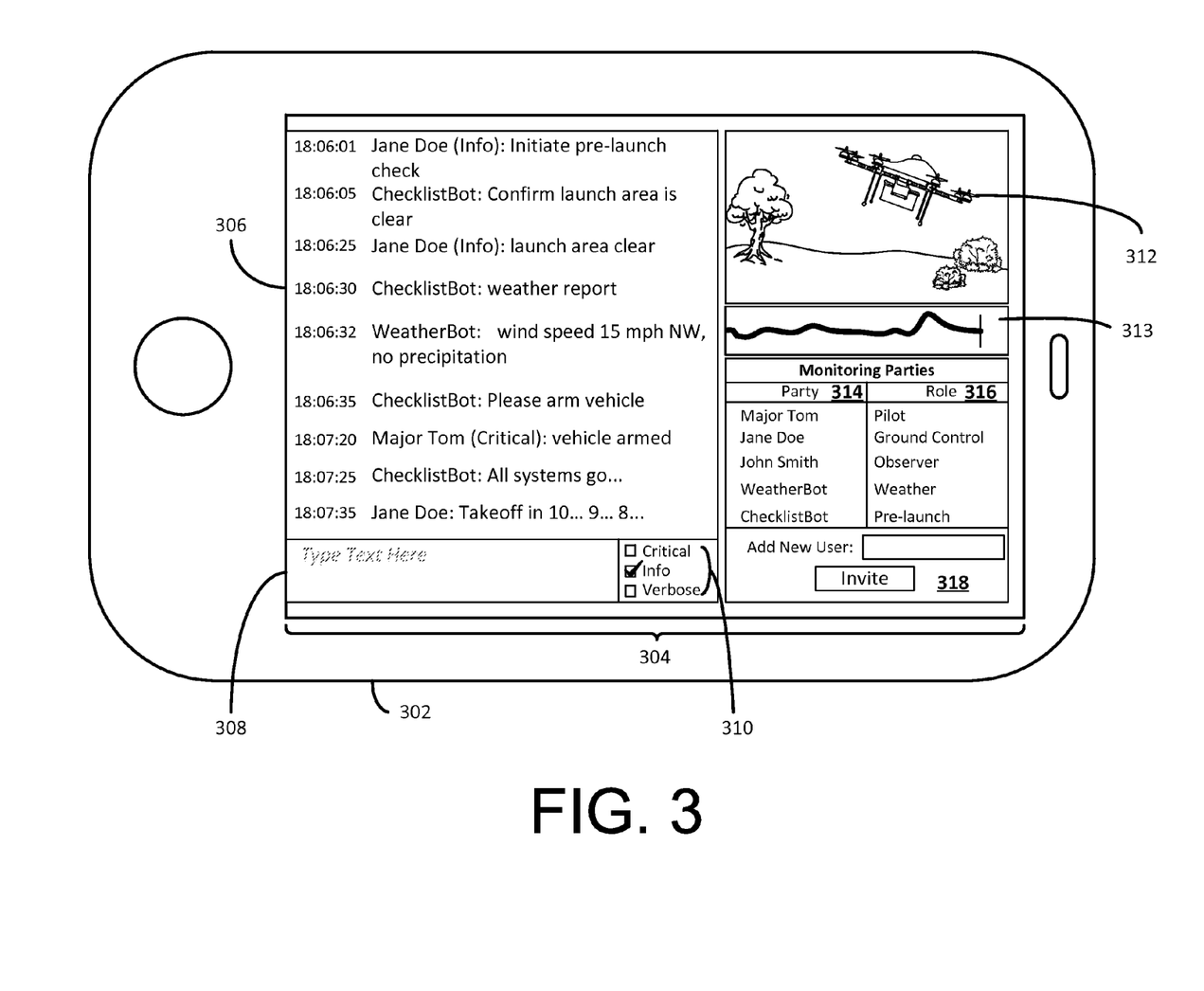
FIG. 3 depicts an illustrative example user interaction in accordance with at least one embodiment.

FIG. 3 depicts an illustrative example user interaction in accordance with at least one embodiment of the current disclosure. In this example, a user device 302 is depicted as displaying a streaming interface 304 in which a user may be provided with streaming information 306 related to a mission event and in which the user is capable of providing log entries of a data log via a provided text input area 308. A data log is a series of comments related to a mission event that are recorded with relation to time. A log entry is any suitable comment of the data log. For example, a log entry may be a text comment recorded by an observer at a particular time. An observer is any entity capable of making comments related to a mission event or in response to receiving queries. For example, an observer may be a person assigned to a particular role or it may be an automated system. In accordance with at least some embodiments, log entries entered into the text input area may be associated with a time marker. In accordance with at least some embodiments, the time marker for a particular log entry may be associated with the time that a user began writing the log entry. In accordance with at least some embodiments, a time marker associated with a particular log entry may be edited or updated in order to more accurately depict the time that an observation was made. In accordance with at least one embodiment, user preferences or user settings may be set so that log entries are automatically backdated by a specified period of time. For example, a user may indicate that each of his or her log entries should be backdated by 2 seconds in order to account for the time that it took the user to begin the log entry.

In accordance with at least some embodiments, a user may provide audio comments. Audio data collected by a user device 302 may be automatically transcribed into textual comment data and associated with a time entry. In at least some embodiments, one or more voice recognition techniques may be used to identify the speaker and associate the transcribed textual comment with that speaker. In accordance with at least some embodiments, the streaming information 306 may be presented to a user in audio format. For example, textual comments provided by one user may be presented audibly to a second user.

In accordance with at least some embodiments, log entries may be assigned a log status 310. For example, a log entry may be assigned a status of critical if it is critical to the mission event. An info status may provide non-critical information that may be necessary for debugging. A verbose status may be used to indicate that the comment is unnecessary to the mission event. In accordance with at least some embodiments, metadata tags may be used to associate log entries with particular log statuses 310. In accordance with at least some embodiments, a user may be associated with a particular role or authorization level. In at least some embodiments, comments, log entries, or other streaming data displayed in the streaming information 306 may be filtered according to a user's role or authorization level. For example, a user may not be able to view comments that the user is not authorized to view. In accordance with at least some embodiments, the user device 302 may be associated with a particular user or user role. In accordance with at least one embodiment, a user may only be authorized to make log entries of a particular status or respond to particular queries.

In accordance with at least some embodiments, the user device 302 may be capable of capturing additional input using one or more sensors. For example, the user device 302 may be capable of capturing video images 312 using a camera device. In accordance with at least some embodiments, the additional input captured by the user device 302 may be transmitted to the service provider and appended to an event stream. In accordance with at least some embodiments, video images 312 may be captured by a different device, or even by the drone itself, and transmitted to the user device 302 for display. In accordance with at least some embodiments, the user device 302 may capture audio data, which may then be aggregated, along with other data, into an event stream. Additionally, the user device may be provided with one or more data streams, which may be visualized in a number of formats. For example, a graphical display 313 may be used to depict received data stream information with relation to time. In at least some embodiments, a current status of the data stream information received by the user device may be presented. For example, the user device may display text that indicates a current wind speed.

In accordance with at least some embodiments, voice recognition may be used in conjunction with the current disclosure in order to provide access control and/or voice-to-text conversion. For example, voice data may be stored for each observer so that the observer is able to be authenticated using the voice data. In at least some examples, an observer may be required to provide a voice sample upon the instantiation of a new mission event in which he or she is involved. In accordance with at least some embodiments, the observer may provide audio comments that are translated into text in the streaming interface 304.

In accordance with at least some embodiments, the streaming interface 304 may present an indication of observers 314 and in some embodiments, observer roles 316. In accordance with at least some embodiments, one or more of the observers may be an automated system, or "bot." In accordance with at least some embodiments, one or more observers 314 may be included automatically. In accordance with at least some embodiments, an observer 314 may be invited by another observer via an invite option 318. An observer role 316 may be specific to a user, or it may be assigned for a particular mission event. For example, an observer with a role of pilot in one mission event may be act as ground control in another mission event. In some embodiments, the video image information 312 presented to an observer may vary based on the role of the user. For example, an observer with a role of ground control may be presented with a video that depicts an overview of the conditions surrounding the drone whereas an observer with a role of pilot may be presented with a view from the perspective of the drone. In accordance with at least some embodiments, the user may be able to switch between different video images 312.

In accordance with at least some embodiments, the streaming interface 304 may enable one or more users to interact with various components of the disclosed system via a user device 302. Interactions may be made available based on a user's role or authorization level. For example, a user that has a role of pilot may be given the ability to control the drone's movement via the user device 302. In this example, the user device 302 may transmit user input to the drone directly, or to the service provider, which may subsequently transmit instructions to the drone. In another example, a user may be given the ability to arm the vehicle or initiate a lift-off via the user device. In accordance with at least some embodiments, a user may be given the ability to initiate a synchronization event, or an event that may later be used to synchronize data streams for aggregation. In accordance with at least some embodiments, one or more external devices may perform an action in response to receiving user input submitted via streaming interface 304. For example, a user may provide textual input to "arm drone" and one or more processors internal to the drone may activate the drone in response to detecting the textual input. Alternatively, a drone lift-off may be prevented until a "launch" comment is received from a particular user or a user with a particular role.

Figure 4:
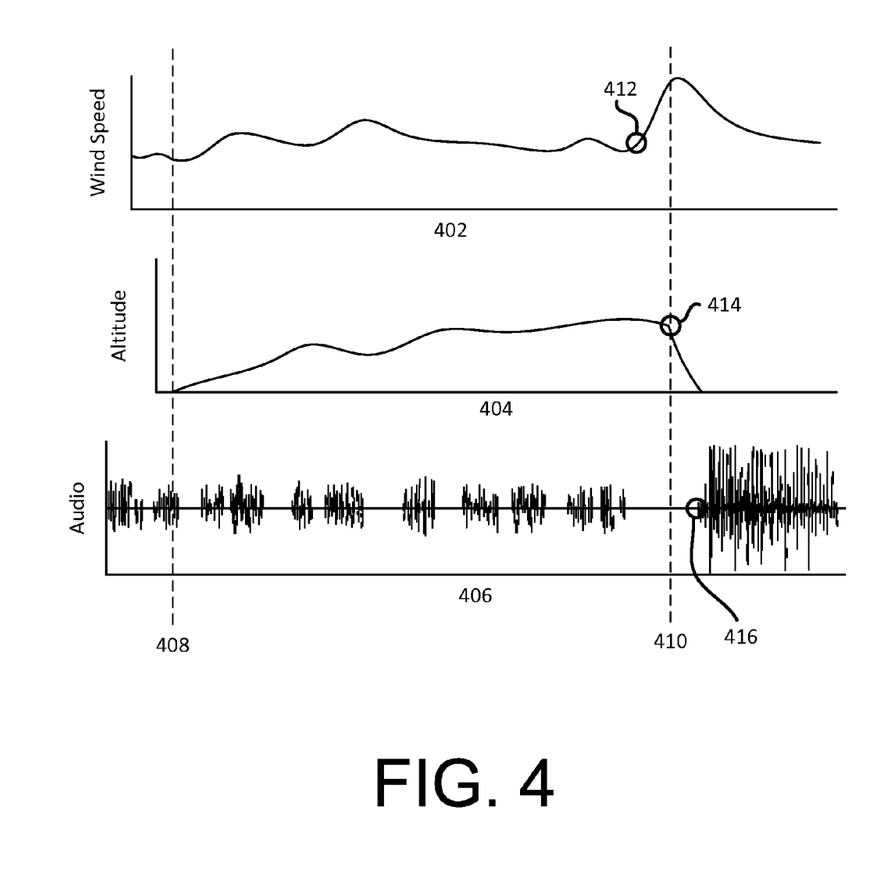
FIG. 4 depicts an illustrative example synchronization of data streams in accordance with at least one embodiment.

FIG. 4 depicts an illustrative example synchronization of data streams in accordance with at least one embodiment. In FIG. 4, some example data streams are depicted. Data streams may vary in their lengths, start times, and/or end times. For example, a data stream related to wind speed data 402 is depicted as having a start time prior to a data stream related to altitude data 404 but after a data stream related to audio data 406.

In accordance with at least one embodiment, the synchronization module may use time markers associated with the streaming data to synchronize data streams. In some embodiments, separate data streams may be associated with separate clocks that result in timing discrepancies between the separate data streams. In accordance with at least some embodiments, the synchronization module may obtain a current time according to a source of the data stream in order to identify timing discrepancies between two or more sources. The time markers associated with each data stream may then be adjusted based on timing discrepancies between the data sources in order to reconcile clock-based differences. For example, time marker 408 may be identified in each of the data streams, upon which the data streams may be synchronized.

In accordance with at least some embodiments, the data streams may be synchronized based on a synchronization event. For example, the drone or a monitoring device may emit a signal at a particular time. By way of further example, the drone may be equipped with a light emitting diode (LED) which is lit up just prior to takeoff to communicate a take-off synchronization event. In this example, a data stream of visual data may be synchronized with data transmitted by the drone itself by identifying the LED light-up event in the visual data stream. In some embodiments, machine vision may be used to identify the synchronization event communicated via LED light-up. Although an LED light-up is mentioned in this example, a synchronization event may be communicated via a radio communication, an audio communication, a visual communication, or any other suitable means of communication.

In accordance with at least some embodiments, the data streams may be combined into a single even stream which may provide a more comprehensive understanding of the conditions surrounding a mission event. For example, each data stream may provide additional information related to the event depicted at time marker 410. For example, the sudden drop in altitude depicted in data stream 404 may indicate that the drone crashed, but would not identify the cause of the crash. The spike in audio data 406 subsequent to time marker 410 or the increase in wind velocity leading up to time marker 410 may provide additional information. It is envisioned that an event stream contain multiple data streams that may help a technician analyze such events. In accordance with at least some embodiments, the service provider may be configured to detect anomalies, or sudden changes in a data stream. Threshold values may be identified for one or more data streams in order to automatically detect anomalies. For example, an increase in wind speed above a threshold value (e.g., a 10% increase in wind speed over a three second period, or a 12% decline in altitude over a two second period) may be flagged for later analysis. Particular data patterns from data streams may also be used to identify certain events. For example, an indication that the altitude of the drone has reached zero may indicate a landing event. In this example, the landing event may be indexed automatically.

In accordance with at least some embodiments, time makers in one or more data streams may be associated with an event. For example, a user may manually edit or select time markers in one or more data streams to be associated with an event. By way of illustrative example, a user may be interested in the event surrounding time marker 410. The user may create an event labeled "drone crash" at time marker 410. However, with relation to this event, the user may elect to index the time marker 412 of data stream 402 associated with the increase in wind speed, the time marker 414 of data stream 404 associated with the decline in altitude, and the time marker 416 of data stream 406 associated with the audio data spike as all being related to the event. In this example, a relationship may be created between different time markers of various data streams. Information related to the event may also be appended or otherwise associated with the selected time markers. For example, a name, description, and/or identifier of the event may be added as metadata to the data streams at the selected time markers.

Figure 5:
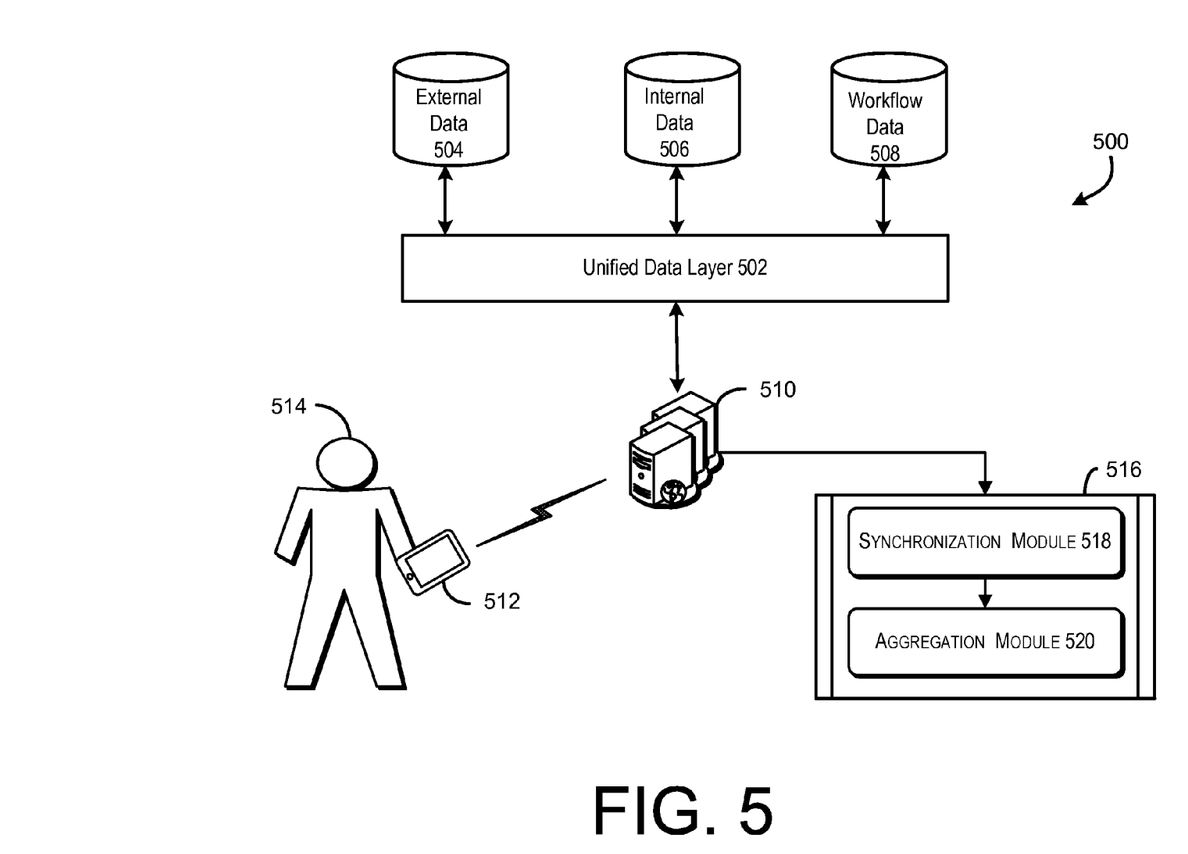
FIG. 5 depicts an example of a data communication flow and presentation in accordance with at least one embodiment.

FIG. 5 depicts a diagram 500 that illustrates an example of a data communication flow and presentation in accordance with at least one embodiment of the disclosure. In FIG. 5, a unified data layer 502 is depicted as a data layer interacting with data from various data stores 504, 506, and 508. Unified data layer 502 is an example of unified data 232 of FIG. 2. Data stores 504, 506, and 508 may include one or more separate data sources containing external data 504 (e.g., wind speed, precipitation, temperature, etc.), internal data 506 (e.g., battery life, turbine speed, weight, etc.), or data related to workflows 508 (pre-launch checklists, post-delivery procedures, etc.). The active unified data layer 502 may aggregate and store data from any number of data stores 504, 506, and 508. Data stored in a unified data layer may be updated from data stores dynamically as new information is received.

In accordance with at least one embodiment, unified data layer 502 may be stored on, or accessible by, a service provider 510. Service provider 510 is an example service provider 206 of FIG. 2. In addition to accessing data located in unified data layer 502, service provider 206 may send data to or receive data from a user device 512, which is depicted in FIG. 5 as being operated by user 514. User device 512 is an example user device(s) 204 of FIG. 2, and may be a mobile device in accordance with at least on embodiment. User device 512 may contain a number of sensors via which input data may be received. Through user device 512, user 514 may provide data to the service provider 510 either intentionally or unintentionally. For example, user device 512 may provide its location data to the service provider 510 without intentional interaction from the user 514. In accordance with at least one embodiment, a user device 514 may provide service provider 510 with data such as input data (e.g. digital images captured by a camera device), location data, or any other suitable data. In accordance with at least one embodiment, service provider 510 may also send data to user device 512. For example, service provider 510 may stream log data to the user device 512.

In accordance with at least one embodiment, user device 512 and/or user 514 may be associated with a particular role or authorization level. In some embodiments, it may be beneficial to limit the number and/or type of users who are able to provide log input in order to prevent overcrowding of log data. In accordance with at least some embodiments, only those with a particular role or authorization level may be able to provide log input. In accordance with at least some embodiments, particular roles or authorization levels may be used to control who is able to contribute to log data under particular conditions. For example, the user 514 of user device 512 may be authorized to respond to particular queries or may be authorized to provide input while certain conditions are met. By way of further example, a user who has a role of pre-launch technician may be prohibited from providing log input once the drone has taken off. By way of further example, a WeatherBot may only be authorized to provide data when queried. In accordance with at least some embodiments, a user device 512 may be associated with particular role. For example, the user device 512 may be associated with a role or a user 514 via a serial number associated with the user device. By way of a second example, a user device 512 may be associated with a user's role once that user logs into an account using the user device 512.

In accordance with at least some embodiments, a user 514 may interact with one or more components of the disclosed system via user device 512. It is envisioned that the user may be provided with the ability to interact with software components or hardware components of the disclosed system. For example, user 514 may initiate a data query by requesting information from unified data layer 502 or any one of data sources 504, 506, or 508. In addition, the user 514 may use user device 512 to swivel or move a camera and thereby adjust the image captured by the camera. In accordance with at least some embodiments, the user 514 may be capable of interacting with each of the elements of the disclosed system. For example, a user may initiate a start-up, shutdown, or reboot of a weather station or other device. The user may also activate or switch between any number of features for one or more devices. For example, the user may switch a camera mode to infrared using the user device 512. In accordance with at least some embodiments, user interactions may be restricted by role. In some embodiments, the ability to perform particular interactions may not even be presented to users who are not authorized to perform the interaction.

In accordance with at least one embodiment, the information received by service provider 510 may be processed at subprocess 516. In subprocess 516, the service provider may synchronize various data sources using synchronization module 518 based at least in part on data received from one or more user devices and data aggregated by the unified data layer. As described elsewhere in this disclosure, the synchronization module 518 may identify synchronization events and align data streams.

In accordance with at least some embodiments, the aggregation module 520 may then aggregate data streams into an aggregated event stream. For example, the aggregation module 520 may use a multiplexing technique to combine a plurality of data streams into a single data stream. In this example, a multiplexer may divide a channel into several channels and assign one data stream to each channel. In this technique, channels may be separated by frequency, timing, and or polarization. For example, a data stream may be segmented so that a fraction of a second of the data stream is added to the event stream in accordance with its proportionality. More particularly, if a data stream is one of ten data streams to be combined into an event stream, then $\frac{1}{10}^{th}$ of each second may contain data from that data stream. In this example, each data stream may have 10 segments of 0.01 seconds each spaced 0.09 seconds apart. In accordance with at least some embodiments, a data stream may be given a higher priority than other data streams. For example, an event stream that contains nine data streams may dedicate $\frac{1}{10}^{th}$ of a second to each of eight data streams and $\frac{2}{10}^{th}$ of a second to one data stream that has been assigned a higher priority. This may result in preserving a higher quality of the data stream with the higher priority.

In accordance with at least some embodiments, the aggregation module 520 may perform one or more data indexing techniques. For example, one or more data streams provided by unified data layer 502 may be indexed and stored in a data stream management system (DSMS). Relationships may be stored for data streams within the DSMS such that data streams related to a single event may be identified via a query. Additionally, the service provider may store time offset information for one or more streams. For example, the service provider may store an indication that stream A is related to stream B as well as an indication that stream B is 0.03 seconds behind stream A. Furthermore, one or more key time markers of a data stream may be indexed. For example, time markers in a data stream that are related to a synchronization event 408 as depicted in FIG. 4 may be indexed in order to synchronize the data streams. In this example, a user may be provided with the ability use indices to associate events with time markers in the data stream. In accordance with at least some embodiments, data stream data may be compressed.

In at least some examples, the aggregated event stream may be provided to one or more display devices for presentation. In accordance with at least some embodiments, this aggregated event stream may be stored by the service provider for future analysis. In the event that the event stream is analyzed, a reviewer may be given the ability to select or switch between different data streams. For example, one event stream may include audio data from multiple observers. The audio data may be overlaid, or the reviewer may be given the ability to elect which audio data stream to analyze.

Figure 6:
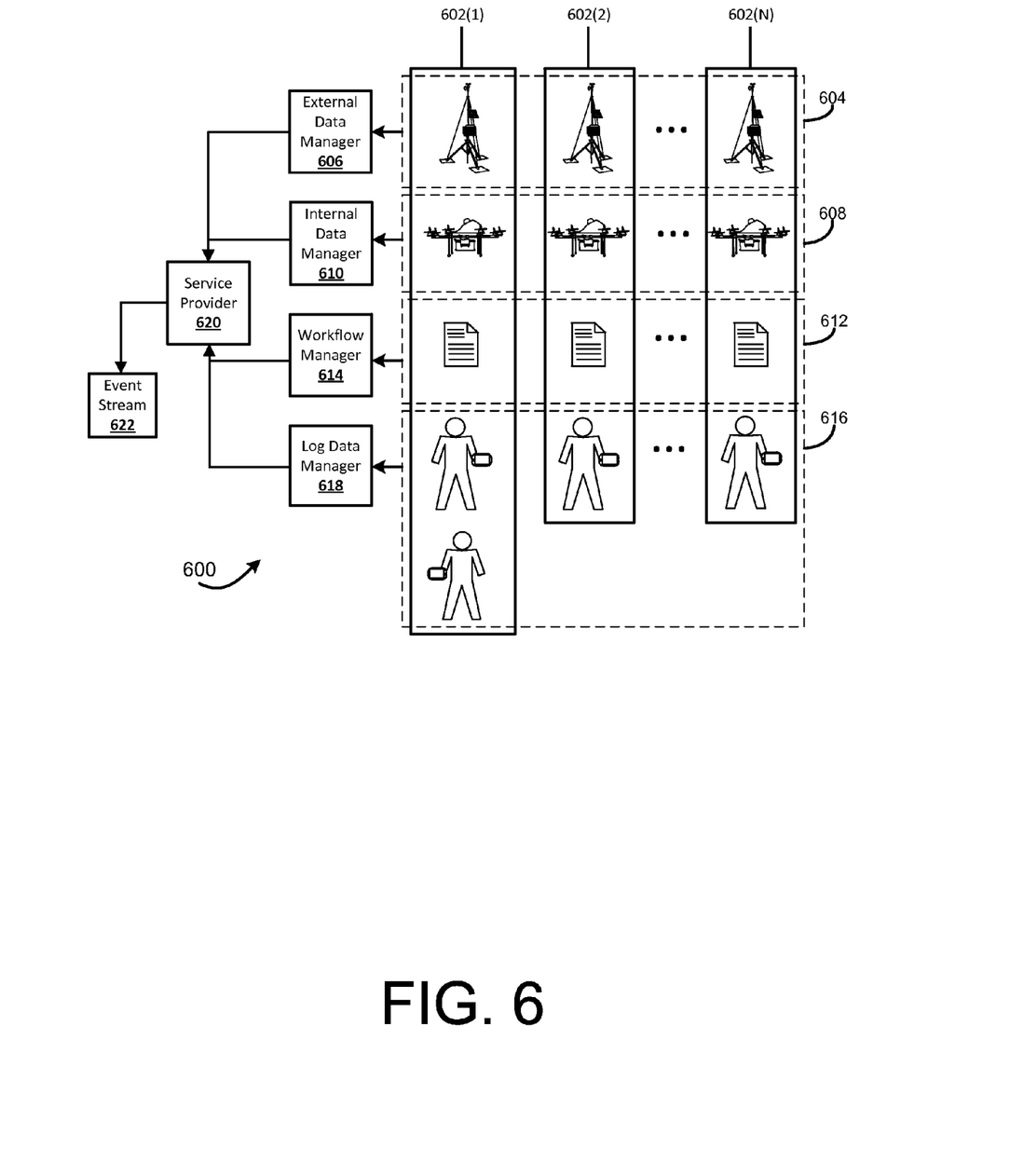
FIG. 6 depicts an illustrative example of an event logging system capable of monitoring multiple drone mission events in accordance with at least one embodiment.

FIG. 6 depicts an illustrative example event logging system 600 capable of monitoring multiple drone mission events. In FIG. 6, multiple drone launch sites 602(1 . . . N) are depicted as being monitored. In accordance with at least some embodiments, multiple external monitoring devices 604 may be located in the vicinity of each launch site 602 in order to monitor external conditions. An external monitoring device 604 is any suitable device configured to collect data related to external conditions related to a launch site (e.g., temperature, wind velocity, precipitation, radar information, image data of the launch site, etc.). An external monitoring device 604 may be fitted with one or more sensors capable of collecting input. For example, there may be a weather station located at each launch site 602 that is capable of monitoring weather conditions local to that respective launch site. Each of the multiple external monitoring devices 604 may be managed by one or more external data manager 606. In accordance with at least one embodiment, each type of external data monitoring device may have its own external data manager 606. For example, weather monitoring devices may be managed by a weather device manager. In accordance with at least some embodiments, an automated response system may be associated with an external data manager 606, such that it is able to retrieve and provide external data related to a particular launch site 602. The automated response system may be configured to act as an observer and answer queries made by a user. For example, WeatherBot may be an automated response system that is configured to detect and respond to weather-related queries for each of launch sites 602(1 . . . N).

In accordance with at least one embodiment, each drone 608 may also provide internal data to an internal data manager 610. Internal data may be any suitable data collected by sensors connected to a drone 608 (e.g., battery life, current altitude, camera imagery, captured audio, etc.). A drone 608 may be fitted with one or more sensors capable of collecting input. In accordance with at least some embodiments, an automated response system may be associated with an internal data manager 610, such that it is able to retrieve and provide internal data related to a particular drone 608. The automated response system may be configured to act as an observer and answer queries directed at a particular drone 608.

In accordance with at least one embodiment, a launch site's progress according to a workflow process 612 may also be monitored by a workflow manager 614. A workflow process 612 may be any suitable information related to a process performed in relation to the drone mission event (e.g., a pre-launch process, a power-down process, a delivery process, etc.). Progress in a process may be manually updated or it may be detected through one or more sensors. For example, a technician may be asked to confirm that the drone is armed as part of the pre-launch process. By way of further example, motion sensors or a laser system may be used to determine that a launch site 602 is clear of obstructions during a pre-launch process. In accordance with at least some embodiments, an automated response system may be associated with a workflow manager 614, such that it is able to retrieve and provide workflow related data for a particular drone 608 or launch site 602. The automated response system may be configured to act as an observer and answer queries directed at a workflow process.

In accordance with at least one embodiment, one or more observers 616 may also provide log entry data via a log data manager 618. Log entry data may be any suitable data provided by an observer that is intended to supplement a data stream (e.g., text input, audio data, data tags, highlighting of data, etc.). In accordance with at least some embodiments, log entry data may be collected by a user device in the possession of the observer. In accordance with at least some embodiments, one or more automated response systems may be configured to respond to log entry data.

Each of data managers 606, 610, 614, and 618 may provide collected data to a service provider 620. In accordance with at least some embodiments, one or more of the provided data may be synchronized and/or aggregated into an event stream 622. For an illustrative example of the event logging system of FIG. 6, consider a scenario in which a mission event for particular drone 608 is being conducted. In this scenario, an instance of a mission event may be instantiated for which streaming information may be made available in a streaming interface (such as the streaming interface 304 of FIG. 3). The mission event instance may be associated with a particular drone that is to be flown. One or more workflow processes may also be associated with the mission event. In accordance with at least some embodiments, particular observers/roles may be identified and those observers may be added to the mission event. Various automated response systems may also be added to the mission event as observers. By way of further example, a WeatherBot and a ChecklistBot may be added to the mission event upon its instantiation. Queries may be made to the automated response systems either explicitly or an automated response system may detect that a query is directed to it. For example, ground control may activate the WeatherBot either by asking about the weather or by directing the message to the WeatherBot (e.g., by using @weatherbot). In this example, one or more activities may be prevented until one or more conditions are met. For example, the drone's take-off may be prevented until the pre-launch checklist is fulfilled. Once the mission event is finished, data may be aggregated into an event stream for the event and stored for later analysis.

Figure 7:
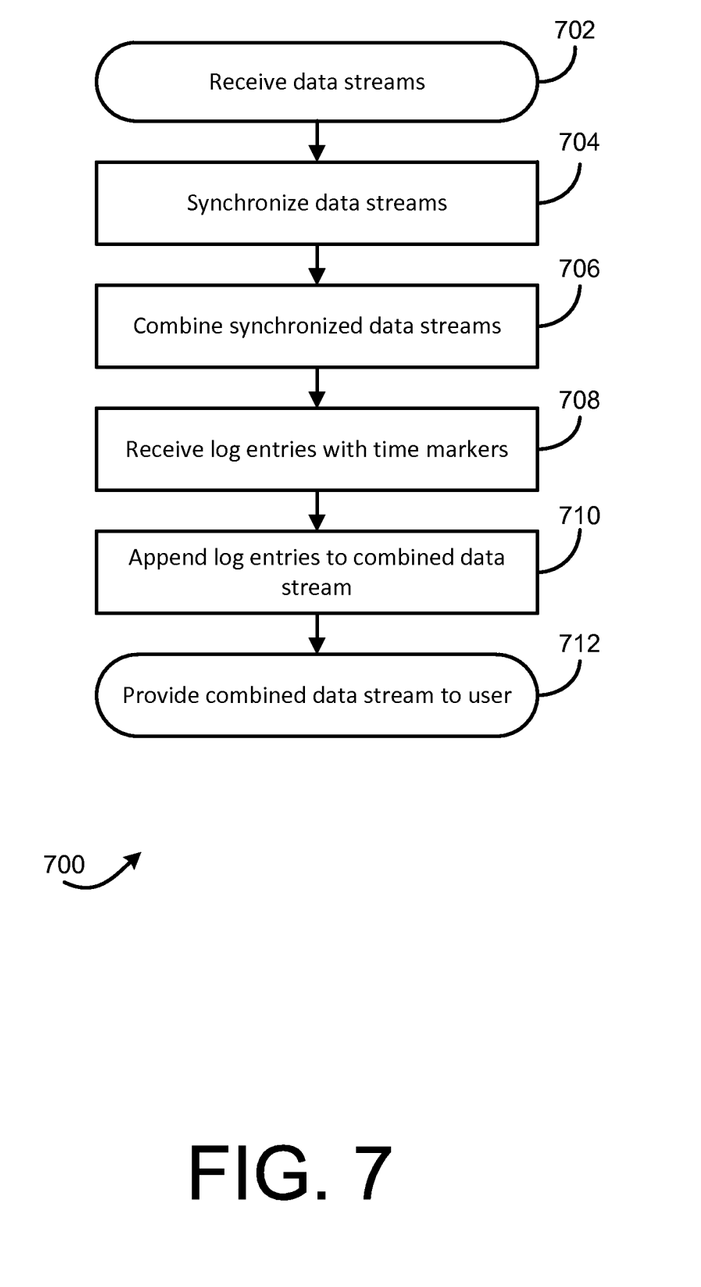
FIG. 7 depicts an illustrative example of an aggregation of data streams and log entries in accordance with at least one embodiment.

FIG. 7 depicts an illustrative example of an aggregation of data streams and log entries in accordance with at least one embodiment. Some or all of the process 700 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. In accordance with at least one embodiment, the process 700 of FIG. 7 may be performed by at least the one or more service providers 206 shown in FIG. 2. The code may be stored on a computer-readable storage medium, for example, in the form of a computer program including a plurality of instructions executable by one or more processors. The computer-readable storage medium may be non-transitory.

The process 700 may begin at 702 when multiple data streams related to a single mission event are received by a service provider. In accordance with at least some embodiments, the multiple data streams may be received in real time, in which case there may be no need for the service provider to synchronize them. However, in some cases, the service provider may receive data streams after the conclusion of the mission event and the process 700 may synchronize the data streams at 704. For example, a mission event may be concluded when an observer indicates that the mission event is over, when the drone is powered down, or in response to any other suitable means of concluding a mission event. In accordance with at least some embodiments, the drone may emit a signal upon the conclusion of the mission event that may act as a synchronization event. In accordance with at least some embodiments, data collected after the conclusion of the event may be combined with the real-time data streams collected by the service provider.

In accordance with at least one embodiment, the synchronized data streams may be aggregated, or combined at 706. In accordance with at least some embodiments, process 700 may use one or more multiplexing techniques for combining a plurality of data streams into a single data stream. In some embodiments, the service provider may also receive one or more log entries provided by observers at 708. Log entries may be provided with a time marker that indicates a time that should be correlated to the log entry. In some embodiments, this time marker may be updated by one or more users. Log entries received by process 700 may be appended to the combined data stream at 710. In accordance with at least some embodiments, log entries may be maintained separate from the single data stream such that they may be associated with a particular point in the data stream via a time marker. Once a single data stream has been created with corresponding log entries, it may be stored for further analysis. In accordance with at least some embodiments, a technician may be provided with the data stream upon request at 712.

Figure 8:
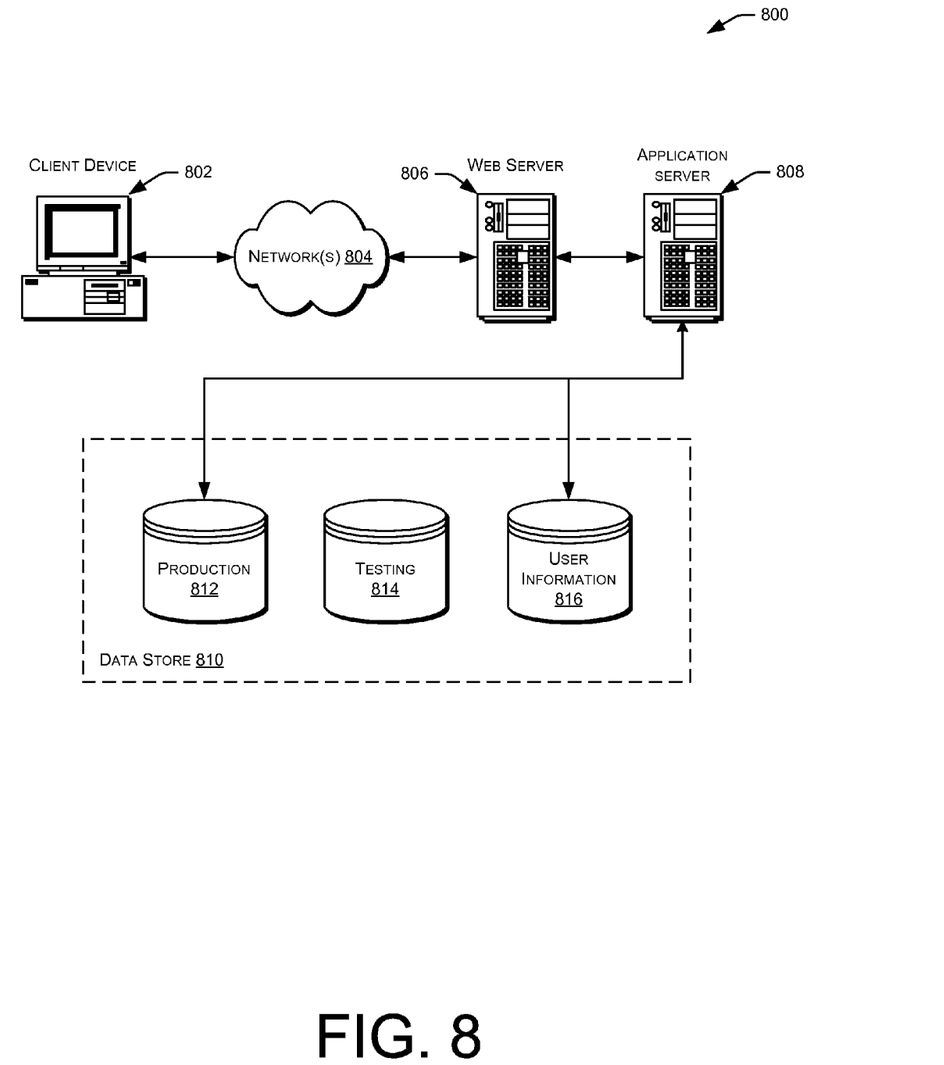
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environtext in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:
1. A computer-implemented method, comprising:
   receiving, at a service provider, a first data stream and a second data stream related to a mission event, the mission event associated with a unmanned aerial vehicle (UAV) flight, wherein at least one of the first data stream and the second data stream includes data internal to the UAV and at least one of the first data stream and the second data stream includes data external to the UAV;

identifying, within each of the first data stream and the second data stream, an indication of a synchronization event;

synchronizing the first data stream and the second data stream based on a position of the indication of the synchronization event within each of the first data stream and the second data stream;

combining a synchronous portion of the first data stream and a corresponding portion of the second data stream into an event stream;

receiving, from a user device, at least one log entry associated with a log entry time, the log entry provided to the user device by a user of the user device;

creating an association between the at least one log entry and the event stream at the log entry time; and providing the event stream and the associated at least one log entry for presentation to the user device.

2. The computer-implemented method of claim 1, wherein the event stream is provided to the user device in real time.

3. The computer-implemented method of claim 1, wherein the first and second data stream are synchronized by matching up corresponding time markers in the data streams associated with the synchronization event.

4. A data compilation system in communication with a UAV, comprising:
   a processor; and
   a memory including instructions that, when executed with the processor, cause the data compilation system to, at least:
   receive multiple data streams from at least one data source related to a mission event, wherein at least one of the multiple data streams includes data internal to the UAV and at least one of the multiple data streams includes data external to the UAV;
   identify, within each of the multiple data streams, an indication of a synchronization event;
   synchronize the multiple data streams based on a position of the indication of the synchronization event within each of the multiple data streams;
   receive log input via a user device;
   combine the multiple data streams and the log input into an event stream, the log input being matched to the synchronized multiple data streams based on a time marker associated with the log entry; and
   provide access to the event stream.

5. The system of claim 4, wherein the multiple data streams includes at least a first data stream and a second data stream that are received from different data sources.

6. The system of claim 4, wherein the log input is one of text input, audio data, data tags, or a highlighting of data.

7. The system of claim 4, wherein the time marker is updateable by at least one user.

8. The system of claim 7, wherein the multiple data streams and the log input are combined into an event stream after a conclusion of the mission event.

9. The system of claim 4, comprising instructions that further cause the system to:

receive, via the user device, an indication of an interaction;
perform an action associated with the indicated interaction.

10. The system of claim 4, wherein the user device is associated with at least one role, the at least one role dictating a level of log input that may be viewed by the user device.

11. A computer system in communication with a UAV that comprises a non-transitory computer readable storage medium storing specific computer-executable instructions that, when executed with a processor, cause the computer system to at least:
   receive, from a user device, a series of comments related to an event;
   receive, from at least one data source other than the user device, multiple data streams related to the event, wherein at least one of the multiple data streams includes data internal to the UAV and at least one of the multiple data streams includes data external to the UAV;
   identify, within each of the multiple data streams, an indication of a synchronization event;
   synchronize the multiple data streams based on a position of the indication of the synchronization event within each of the multiple data streams;
   associate the series of comments to specific times of the event corresponding to times within the multiple data streams; and
   combine the series of comments and the multiple data streams related to the event into an event stream.

12. The non-transitory computer readable storage medium of claim 11, wherein the comments related to an event are made by an observer.

13. The non-transitory computer readable storage medium of claim 12, wherein at least one second observer is prevented from providing comments based at least in part on a role associated with the at least one second observer.

14. The non-transitory computer readable storage medium of claim 11, wherein at least one comment of the series of comments is associated with a log status.

15. The non-transitory computer readable storage medium of claim 11, wherein the series of comments comprises audio based comments.

16. The non-transitory computer readable storage medium of claim 15, wherein the computer system is further caused to at least determine an identity of an observer by using voice recognition.

17. The non-transitory computer readable storage medium of claim 16, wherein the observer has one or more permissions based at least in part on the determined identity.

18. The non-transitory computer readable storage medium of claim 11, wherein the series of comments and the multiple data streams related to the event are combined using a multiplexing technique or a data indexing technique.

19. The non-transitory computer readable storage medium of claim 11, wherein the computer system is further caused to at least synchronize at least the multiple data streams based at least in part on a synchronization event.

* * * * *